United States Patent [19]

Maas, Jr. et al.

[11] 4,093,783

[45] June 6, 1978

[54] NOVEL FORMULATIONS $M_2UO_2F_2$ AND THEIR USE IN ELECTROCHEMICAL CELLS

[75] Inventors: Edward T. Maas, Jr., Kendall Park; John M. Longo, New Providence; Chin H. Chang, Edison, all of N.J.

[73] Assignee: Exxon Research and Engineering Company, Linden, N.J.

[21] Appl. No.: 789,813

[22] Filed: Apr. 22, 1977

[51] Int. Cl.² .................................... H01M 14/00
[52] U.S. Cl. ........................................ 429/5; 429/194; 429/196; 429/199; 429/218; 423/253
[58] Field of Search ............... 429/194, 196, 218, 199, 429/5; 423/253

[56] References Cited

U.S. PATENT DOCUMENTS

| | | | |
|---|---|---|---|
| 3,189,485 | 6/1965 | Panzer | 429/5 |
| 3,709,834 | 1/1973 | Fukuda et al. | 429/5 X |
| 3,990,911 | 11/1976 | Mannheimer et al. | 429/5 |

Primary Examiner—Charles F. LeFevour
Attorney, Agent, or Firm—R. D. Hantman

[57] ABSTRACT

The present invention is directed to compositions of matter having the formula $M_2UO_2F_2$ where each M is any alkali metal ion or mixtures thereof. The present invention is also directed to electrochemical cells having anodes containing anode-active alkali metal, electrolytes capable of conducting ions of said alkali metal, and cathodes containing cathode-active material having the formula $M_2UO_2F_2$ where each M is any alkali metal ion or mixtures thereof. In another embodiment the cathode-active material has the formula $UO_2F_2$.

34 Claims, 5 Drawing Figures

NOVEL FORMULATIONS $M_2UO_2F_2$ AND THEIR USE IN ELECTROCHEMICAL CELLS

BACKGROUND OF THE INVENTION

The present invention is directed to compositions of matter having the formula $M_2UO_2F_2$ where each M is any alkali metal ion or mixtures thereof. The present invention is also directed to electrochemical cells having anodes containing anode-active alkali metal, electrolytes capable of conducting ions of said alkali metal, and cathodes containing cathode-active material having the formula $M_2UO_2F_2$ where each M is any alkali metal ion or mixtures thereof. In another embodiment the cathode-active material has the formula $UO_2F_2$.

Generally, electrochemical cells commonly referred to as batteries contain at least two electrodes of differing types. One of these, commonly referred to as the anode, contains an electropositive material, i.e., a material which can donate electrons which results in the anode material assuming a positive charge. The other electrode, commonly referred to as the cathode, contains an electronegative material capable of accepting the electrons released from the anode and, in doing so, the material of the cathode assumes a negative charge. These two types of electrodes are both immersed in an electrolyte which is capable of moving charged ions in order that both electrodes remain uncharged while the electronic conductivity of the electrolyte medium is so low as to allow the electrons to migrate from the anode to the cathode through an external circuit. The flow of electrons through such a circuit can be utilized to perform useful work.

The present invention is related to traditional primary and secondary cells in which the electrical energy is derived from active materials stored in solid electrodes.

SUMMARY OF THE INVENTION

Figure 1:
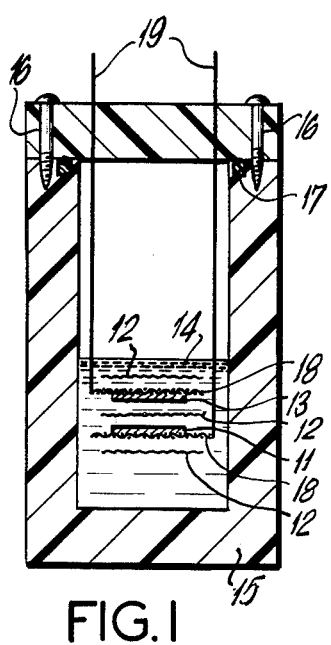
FIG. 1 is a diagrammatic illustration of the electrochemical cell according to the present invention.

The present invention includes a composition of matter having the formula $M_2UO_2F_2$ where each M is any alkali metal ion or mixtures thereof.

The invention also includes an electrochemical cell. In one embodiment, the cell includes a container, an anode which includes as active material an alkali metal or alloys containing one or more alkali metals, an electrolyte capable of carrying ions of the alkali metal, and a cathode which includes an active material having the formula $M_2UO_2F_2$ where each M is any alkali metal ion or mixtures thereof.

In another embodiment, the anode and electrolyte are unchanged, but the cathode includes an active material having the formula $UO_2F_2$.

DESCRIPTION OF THE PREFERRED EMBODIMENT

The present invention includes the composition of matter, $M_2UO_2F_2$ where each M is any alkali matal ion or mixtures thereof. A preferred alkali metal is lithium. The composition of matter is useful in electrochemical devices, e.g., batteries, as will be discussed below.

The expression "mixtures thereof" is used so as to include components of $M_2UO_2F_2$ where each M may be different from each other e.g. $LiNaUO_2F_2$ and $KCsUO_2F_2$. In addition, each M may represent a combination of different alkali metals such that the total net positive charge attributable to the alkali metals in the compound is 2 e.g. $LiNa_{0.5}K_{0.5}UO_2F_2$ and $Li_{0.7}Na_{0.3}Cs_{0.4}Rb_{0.6}UO_2F_2$.

The present invention also includes an electrochemical cell having a container, an anode, an electrolyte, and a cathode.

In one embodiment, the cathode includes $M_2UO_2F_2$ as its cathode-active material. The structure of the cathode is not necessarily formed entirely of the cathode-active material. The cathode-active material may be mixed with graphite and a binder such as a powdered Teflon and may also include an appropriate metal grid consisting of nickel, copper, etc. Preferably, the cathode consists of the cathode-active material with graphite and powdered Teflon affixed to a nickel screen. The amount of graphite and binder that is mixed with the cathode-active material is not a critical parameter, but preferably the mixture consists of 65 wt. % cathode-active material, 25 wt. % graphite and 10 wt. % binder.

The anode of the electrochemical cell of the present invention includes as active material an electropositive metal selected from the group Li, Na, K. Rb, Cs and alloys containing one or more of these metals. Preferably, the alkali metal is Li. The anode may be in the form of an ingot or pressed into a convenient shape and also may be affixed to an appropriate noninteracting grid, made of, for example, nickel, nickel alloys, stainless steel, silver, or platinum.

The electrolyte system must be capable of transferring ions of the anode material to the cathode. Suitable electrolytes include organic or inorganic non-aqueous systems.

The organic electrolyte comprises an organic solvent selected from the group consisting of tetrahydrofuran, N-nitrosodimethylamine, dimethylsulfite, propylene carbonate, gamma-butyrolactone, acetonitrile, dioxolane, and mixtures thereof, and has dissolved therein soluble salts of the anode metals, for exmple, the perchlorates, hexafluorophosphates, tetrafluoroborates, tetrachloroaluminates, and hexafluoroarsenates of lithium.

The inorganic electrolyte has an inorganic solvent material selected from the group consisting of phosphorus oxychloride, monofluorophosphoryl dichloride, thionyl chloride, sulfuryl chloride, and mixtures thereof. A solute is dissolved in the inorganic solvent which provides the cation of the anode metal and at least one anion of the general formula $JX_4^-$, $QX_6^-$, and $LX_6^=$, where J is an element selected from the group consisting of boron and aluminum, Q is an element selected from the group consisting of phosphorus, arsenic, and antimony, L is an element selected from the group consisting of tin, zirconium, and titanium; and X is any halogen.

Preferred electrolytes include 0.5 to 2.0 M lithium perchlorate solutions in 0.5:4.0 to 4.0:0.5 (by volume) mixtures of tetrahydrofuran and propylene carbonate. More preferred electrolytes are 1.0 to 2.0 M lithium perchlorate solutions in 1.0:2.0 to 2.0:1.0 (by volume) mixtures of tetrahydrofuran and propylene carbonate. The most preferred electrolyte is a 2.0 M lithium perchlorate solution in a 2:1 (by volume) mixture of tetrahydrofuran and propylene carbonate.

The preferred electrolytes also include 0.5 to 2.5 M lithium perchlorate solutions in dioxolane. More preferred electrolytes are 1.0 to 2.5 M lithium perchlorate solutions in dioxolane. A most preferred electrolyte is a 2.5 M lithium perchlorate solutions in dioxolane.

Another preferred electrolyte system includes 0.5 to 2.0 M solutions of lithium tetrachloroaluminate in thionyl chloride. More preferred electrolytes are 1.0 to 2.5 M solutions of lithium tetrachloroaluminate in thionyl chloride. A most preferred electrolyte is a 1.5 M solution of lithium tetrachloroaluminate in thionyl chloride.

The cell described above must be charged after construction and before use.

In another embodiment of the cell, the cathode includes as active material $UO_2F_2$. The structure of the cathode is similar to that in the first embodiment except for the substitution of $UO_2F_2$ for the fully metallated $M_2UO_2F_2$. For this embodiment of the cell, the anode and electrolyte remain unchanged from the first embodiment. A preferred anode-active metal is lithium.

In this embodiment of the cell, the cell is operable after construction, i.e., it need not be charged before operation.

The following examples illustrated are given to enable one skilled in the art to more clearly understand and practice the invention. The examples are given for illustrative purposes only and are not to be considered as limitations upon the scope of the invention.

EXAMPLE 1

Synthesis of $Li_2UO_2F_2$

Approximately 75 cc of dried hexane is added to 10g of $UO_2F_2$ (anhydrous). This mixture is vigorously stirred and 80 cc of a hexane solution of n-butyl lithium (22 wt. %) is added. Heat is applied to the reaction mixture and the entire mixture is allowed to reflux for 24 hours. At this time the entire mixture is cooled to room temperature and the desired product, $Li_2UO_2F_2$, which is insoluble in the reaction media is separated from the excess n-butyl lithium and hexane by standard filtration techniques. The product is then washed with 50 cc of anhydrous hexane and allowed to dry by evaporation under an inert atmosphere (water and oxygen free $N_2$).

All of the above manipulations are carried out in an inert atmosphere glove box filled with $N_2$ and equipped with standard water vapor and oxygen removal equipment.

Analytical data for the material so produced are presented in Table I.

TABLE I

| Elemental Analysis for $Li_2UO_2F_2$ | | |
|---|---|---|
| Element | Calculated (wt. %) | Obs. |
| Li | 4.31 | 4.36 |
| U | 73.94 | 73.89 |
| O | 9.94 | 9.93 |
| F | 11.80 | 11.80 |
| C | 0.00 | ≦0.26 |
| H | 0.00 | ≦0.30 |
| Li/U | 2.00 | 2.02 |

EXAMPLE 2

Figure 2:
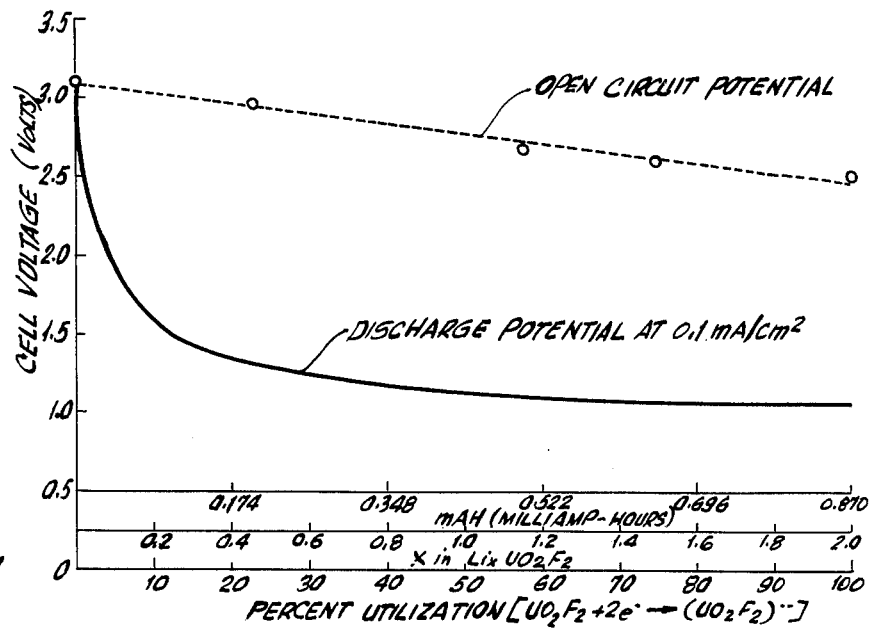
FIG. 2 is a graph displaying the cell potential both at closed circuit and at open circuit, when $UO_2F_2$ was employed as a cathode-active material according to the present invention.

In this Example, 5.0 mg of $UO_2F_2$ were mixed with 25.0 mg of graphite and 3.3 mg of polytetrafluoroethylene powder. Several drops of xylene were added to this mixture to form a thick paste. The paste was evenly spread in a 1 cm² cavity of a stainless steel pressing die positioned on a 1.2 cm × 1.2 cm square nickel screen which had a sheet of polytetrafluoroethylene underneath. The nickel screen has a previously spot welded nickel wire lead attached. A 1 cm² polytetrafluoroethylene disc was then placed on the cavity and the assembly was pressed to 6000 lb. pressure at room temperature for a period of several minutes. The lithium anodes were prepared by pressing commercial lithium ribbon (⅜ in. wide and 1/16 in. thick) onto a 1.2 cm × 1.2 cm square nickel screen to which a nickel lead had previously been spot welded. The test cell was assembled as shown in FIG. 1. The cell includes a cathode-active material 11, and an anode-active material 13, each sandwiched between two layers of glass fiber filter paper 12. Both electrodes 11 and 13 and filter paper 12 were rigidly positioned on polytetrafluoroethylene supports (not shown). The cathode-active material 11 and anode-active material 13 are pressed onto Ni screens 18 with Ni wires 19 spot welded to the screens 18. The electrodes 11 and 13 and filter paper 12 are immersed in electrolyte 14 which is housed in a teflon container 15 with end cover 16 and O-ring 17 seal between the container 15 and cover 16. FIG. 2 shows the closed and open circuit potentials of the discharge of the above-described cell.

EXAMPLE 3

Figure 3:
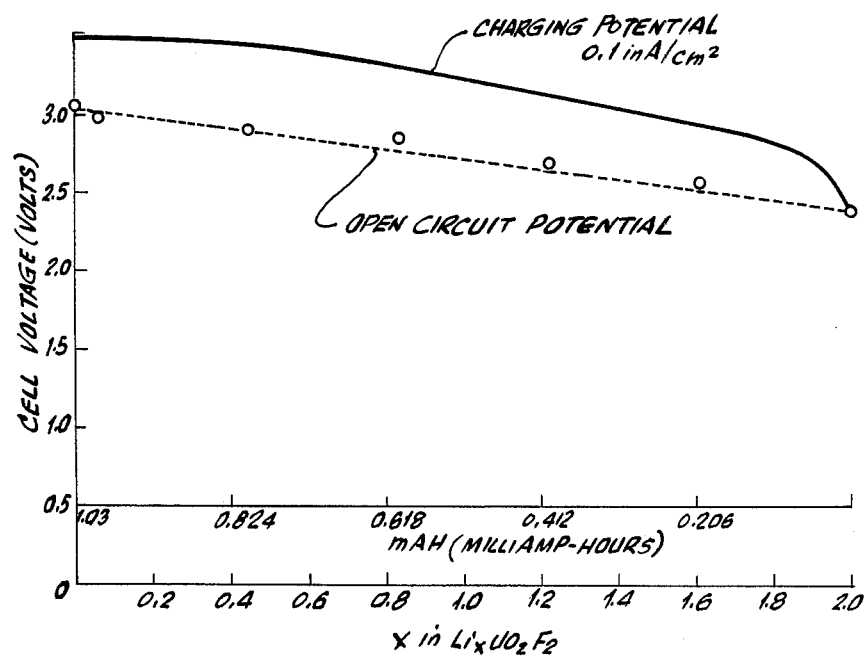
FIG. 3 is a graph displaying the cell potential, both in the charging mode and at open circuit, when an electrochemical cell was constructed with the cathode-active material being $Li_2UO_2F_2$.
Figure 4:
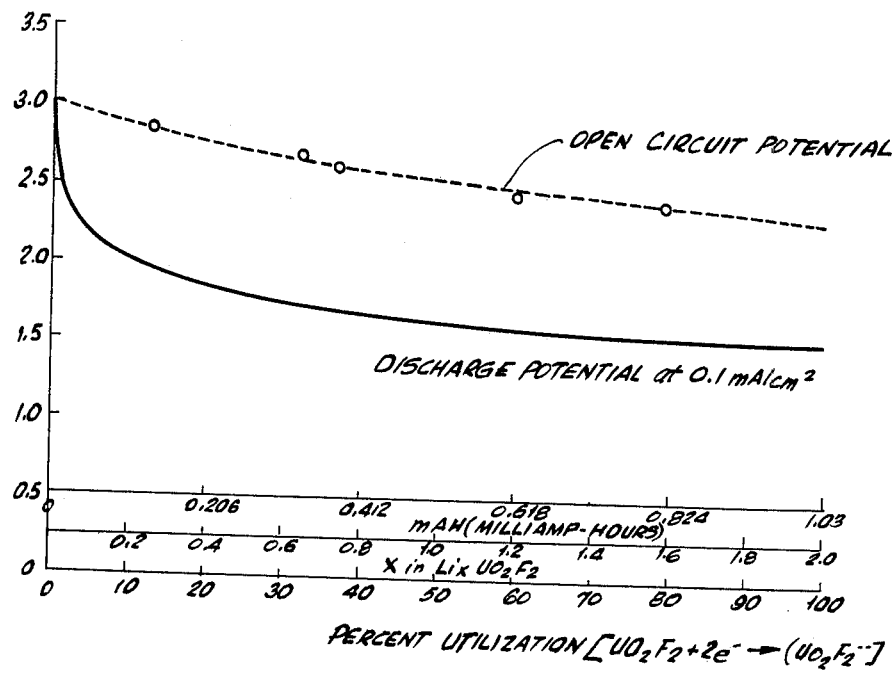
FIG. 4 is a graph displaying the cell potential, both at closed circuit and at open circuit, during discharge of an electrochemical cell according to the present invention in which the cathode-active material was $Li_2UO_2F_2$ which was initially activated by a charging step (show in FIG. 3).
Figure 5:
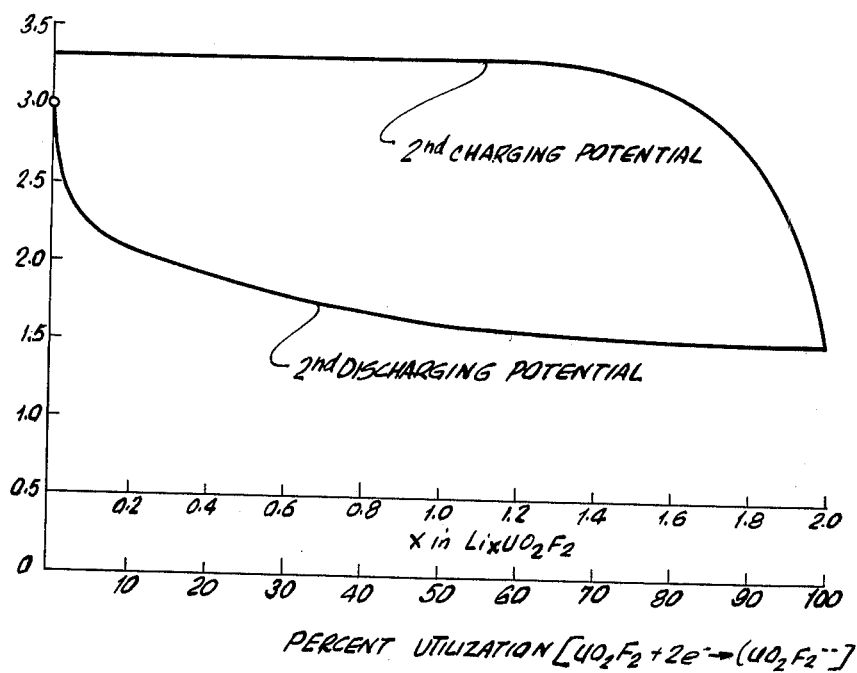
FIG. 5 is a graph showing the cell potential of the electrochemical cell of FIGS. 3 and 4 in a closed circuit configuration during a second charging cycle and a second discharging cycle.

Following the general procedures of Example 2, a test cell containing 6.2 mg $Li_2UO_2F_2$, 14 mg graphite and 3 mg polytetrafluoroethylene powder as the cathode mixture was assembled. The test cell was charged and discharged galvanostaticly. FIG. 3 shows the closed and opened circuit potentials of the first charging. FIG. 4 shows the first discharging cycle and FIG. 5 shows the second charging and discharging cycle.

What is claimed is:

1. A composition of matter having the formula $M_1UO_2F_2$ where each M is any alkali metal ion or mixtures thereof.

2. The composition of matter of claim 1 in which M is a lithium ion.

3. An electrochemical cell comprising:
   (a) a container;
   (b) a cathode including active material having the formula $M_2UO_2F_2$ where each M is any alkali metal ion or mixtures thereof;
   (c) an anode including as active material the same metal (s) M as in said cathode; and
   (d) a liquid non-aqueous electrolyte in said container capable of carrying ions of said metal(s).

4. The electrochemical cell of claim 3 in which said alkali metal is lithium.

5. The electrochemical cell of claim 3 in which said electrolyte is an organic nonaqueous system.

6. The electrochemical cell of claim 5 in which said organic electrolyte comprises an organic solvent selected from the group consisting of tetrahydrofuran, N-nitrosodimethylamine, dimethylsulfite, propylene carbonate, gamma-butyrolactone, acetonitrile, dioxalane, and mixtures thereof, and has dissolved therein soluble salts of the anode metals.

7. The electrochemical cell of claim 6 in which said soluble salt is selected from the group consisting of perchlorates, hexafluoroarsenates, tetrafluoroborates, tetrachloroaluminates and hexafluorcarsenates of lithium.

8. The electrochemical cell of claim 7 in which said electrolyte is between 0.5 to 2.0 M lithium perchlorate solution in a 0.5:4.0 to 4.0:0.5 (by volume) mixture of tetrahydrofuran and propylene carbonate.

9. The electrochemical cell of claim 8 in which said electrolyte is between 1.0 to 2.0 M lithium perchlorate solution in a 1:2 to 2:1 (by volume) mixture of tetrahydrofuran and propylene carbonate.

10. The electrochemical cell of claim 9 in which said electrolyte is 2 M lithium perchlorate solution in a 2:1 (by volume) mixture of tetrahydrofuran and propylene carbonate.

11. The electrochemical cell of claim 7 in which said electrolyte is between 0.5 to 2.5 M lithium perchlorate solution in dioxolane.

12. The electrochemical cell of claim 11 in which said electrolyte is between 1.0 to 2.5 M lithium perchlorate solution in dioxolane.

13. The electrochemical cell of claim 12 in which said electrolyte is 2.5 M lithium perchlorate solution in dioxolane.

14. The electrochemical cell of claim 7 in which said electrolyte is between 0.5 to 2.0 M lithium tetrachloroaluminate in thionyl chloride.

15. The electrochemical cell of claim 14 in which said electrolyte is between 1.0 to 2.5 M lithium tetrachloroaluminate in thionyl chloride.

16. The electrochemical cell of claim 15 in which said electrolyte is 1.5 M lithium tetrachloroaluminate in thionyl chloride.

17. The electrochemical cell of claim 3 in which said electrolyte is an inorganic nonaqueous system.

18. The electrochemical cell of claim 17 in which said inorganic electrolyte comprises an inorganic solvent material selected from the group consisting of phosphorus oxychloride, monofuorophosphoryl dichloride, thionyl chloride, sulfuryl chloride, and mixtures thereof and has dissolved therein a solute for providing the cation of the anode metal and at least one anion of the general formula $JX_4^-$, $OX_6^-$, and $LX_6^=$, where J is an element selected from the group consisting of boron and aluminum, Q is an element selected from the group consisting of phosphorus, arsenic, and antimony, L is an element selected from the group consisting of tin, zirconium and titanium; and X is a halogen.

19. An electrochemical cell comprising:
  (a) a container;
  (b) a cathode including active material having the formula $UO_2F_2$;
  (c) an anode containing as active material an alkali metal or an alloy containing one or more alkali metals; and
  (d) a liquid non-aqueous electrolyte in said container capable of carrying ions of said metal.

20. The electrochemical cell of claim 19 in which said anode includes the alkali metal lithium.

21. The electrochemical cell of claim 19 in which said electrolyte is an organic nonaqueous system.

22. The electrochemical cell of claim 21 in which said organic electrolyte comprises an organic solvent selected from the group consisting of tetrahydrofuran, N-nitrosodiumethylamine, dimethylsulfite, propylene carbonate, gammabutyrolactone, acetonitrile, dioxolane, and mixtures thereof, and has dissolved therein soluble salts of the anode metals.

23. The electrochemical cell of claim 22 in which said soluble salt is selected from the group consisting of perchlorates, hexafluorophosphates, tetrafluoroborates, tetrachloroaluminates and hexafluoroarsenates of lithium.

24. The electrochemical cell of claim 23 in which said electrolyte is between 0.5 to 2.0 M lithium perchlorate solution in a 0.5:4.0 to 4.0:0.5 (by volume) mixture of tetrahydrofuran and propylene carbonate.

25. The electrochemical cell of claim 24 in which said electrolyte is between 1.0 to 2.0 M lithium perchlorate solution in a 1:2 to 2:1 (by volume) mixture of tetrahydrofuran and propylene carbonate.

26. The electrochemical cell of claim 25 in which said electrolyte is 2 M lithium perchlorate solution in a 2:1 (by volume) mixture of tetrahydrofuran and propylene carbonate.

27. The electrochemical cell of claim 23 in which said electrolyte is between 0.5 to 2.5 M lithium perchlorate solution in dioxolane.

28. The electrochemical cell of claim 27 in which said electrolyte is between 1.0 to 2.5 M lithium perchlorate solution in dioxolane.

29. The electrochemical cell of claim 28 in which said electrolyte is 2.5 M lithium perchlorate solution in dioxolane.

30. The electrochemical cell of claim 23 in which said electrolyte is between 0.5 to 2.0 M lithium tetrachloroaluminate in thionyl chloride.

31. The electrochemical cell of claim 30 in which said electrolyte is between 1.0 to 2.5 M lithium tetrachloroaluminate in thionyl chloride.

32. The electrochemical cell or claim 31 in which said electrolyte is 1.5 M lithium tetrachloroaluminate in thionyl chloride.

33. The electrochemical cell of claim 19 in which said electrolyte is an inorganic nonaqueous system.

34. The electrochemical cell of claim 33 in which said inorganic electrolyte comprises an inorganic solvent material selected from the group consisting of phosphorus oxychloride, monofluorophosphoryl dichloride, thionyl chloride, sulfuryl chloride, and mixtures thereof and has dissolved therein a solute for providing the cation of the anode metal and at least one anion of the general formula $JX_4^-$, $QX_6^-$, and $LX_6^=$, where J is an element selected from the group consisting of boron and aluminum, Q is an element selected from the group consisting of phosphorus, arsenic, and antimony, L is an element selected from the group consisting of tin, zirconium and titanium; and X is a halogen.

* * * * *

UNITED STATES PATENT OFFICE
CERTIFICATE OF CORRECTION

PATENT NO. : 4,093,783
DATED : June 6, 1978
INVENTOR(S) : Edward T. Maas, Jr. et al It is certified that error appears in the above-identified patent and that said Letters Patent are hereby corrected as shown below:

In claim 1, line 2, the formula "$M_1UO_2F_2$" should read as follows: $M_2UO_2F_2$.

Signed and Sealed this

Ninth Day of January 1979

[SEAL]

Attest:

RUTH C. MASON
Attesting Officer

DONALD W. BANNER
Commissioner of Patents and Trademarks